United States Patent Office 2,728,730
Patented Dec. 27, 1955

2,728,730

ELECTROLUMINESCENT PHOSPHORS

Keith H. Butler, Marblehead, and Horace H. Homer, Arlington, Mass., assignors to Sylvania Electric Products Inc., Salem, Mass., a corporation of Massachusetts No Drawing. Application June 8, 1951,
Serial No. 230,713

5 Claims. (Cl. 252—301.6)

This invention relates to electroluminescent phosphors and to the manufacture thereof.

Such phosphors differ from other types of phosphors, in that they luminesce when suspended in a suitable dielectric medium in a varying electric field.

One of the most efficient phosphors of the electroluminescent type is zinc sulfide containing small amounts of one or more activators such as lead, copper and manganese.

The preparation of such phosphors has previously been accomplished by batch methods as shown in the copending application Serial No. 180,783, filled August 22, 1950, by Elmer F. Payne. In that application, the raw materials for the phosphor are fired in a tray inside a silica tube which is heated along part of its length and closed except for small inlet and outlet tubulations through which a stream of nitrogen or other substantially inert gas is kept flowing gently. We have found that during the firing, certain volatile materials are produced, such as water, hydrogen sulphide, lead chloride and zinc chloride.

All of the lead chloride, most of the zinc chloride and some of the water remain condensed inside the cooler portion of the silica tube and do not escape therefrom. Thus, when a thick layer of the phosphor mixture is so fired, the center of the fired mass is often dark in color, indicating that the evolved hydrogen sulfide reacts at least in part with the lead and copper components of the mixture to form the corresponding sulfides as separate phases or crystals. While these may later dissolve in the zinc sulfide to form solid solutions, there is a marked tendency for them to remain unchanged during the later stages of firing.

Such separate sulfide crystals are of dark color and of high electrical conductivity, both of which are detrimental to the phosphor. Because of their dark color, they absorb some of the generated light, and because of their high conductivity, they may cause excessive current through the electroluminescent lamp in which they are used, or may even cause a short-circuit.

We have found that the dark discoloration can be reduced, the phosphor conductivity decreased, and the luminescent brightness of the phosphor greatly improved by a rapid rate of flow of inert gas over the phosphor ingredients during the firing thereof and by insuring that the outlet is large enough to exhaust the gas without appreciable recirculation of volatile material. We find also that prefiring the phosphor in an initial zone of reduced temperature improves the luminescence, apparently because the hydrogen sulfide is largely evolved at the relatively low temperature of the preheating zone and is removed by the gas stream before it can react with the lead and copper present in the mixture. However, the increase in emission brightness obtained from the phosphor is more than can be attributed solely to elimination of the dark-colored material, so that some other beneficial action must also occur in the practice of our method.

The lead content of the resultant phosphor is of the order of only about 0.001% by weight, that is, it is between about 0.01% and 0.001% and this small amount appears to be present as lead in the phosphor matrix itself, and not as free lead sulfide crystals.

We have found also that if the powdered raw materials are in a fluffy condition rather than in a compacted condition, the hydrogen sulfide formed will escape more readily from the mixture itself and hence have less time for reaction with said mixture as evolved. For this reason, hammer-milling after dry mixing in a tumbling barrel is generally superior to other methods for mixing the ingredients.

In one embodiment of the invention, a silica tube about six feet long and three inches in diameter, with a quarter-inch wall, was externally heated over a four foot length at its middle, but not over its ends, the latter receiving heat only from the middle of the tube and accordingly attaining a lesser temperature. The free end of the tube was left open, while the other end was closed by an air lock through which each tray must pass to emerge. This insured that the flow of gas through the tube would be disturbed as little as possible by the withdrawal of the fired trays. The trays would pass through a sliding gate into an air-lock chamber at the end of the tube, and then through another sliding gate at the other end of the air-lock.

A series of trays of the starting mixture are pushed or carried through the heated tube from the open end to the other end in short steps. Nitrogen, argon, neon or other gas substantially inert with respect to the substances present, is passed through the silica tube at a rate of about 0.6 liter per minute in a direction opposite to that of the movement of the trays. The trays used are of silica, six inches long, two inches wide and an inch and one half deep. The size of the trays and of the silica tube can be varied, as can the rate of flow of the inert gas, provided that the phosphor is heated to the proper temperature for the proper time, and that the rate of gas flow is sufficient to insure complete removal of the volatile materials before they have time to react appreciably with the other components of the mixture.

The method here described can be used with good results in the manufacture of zinc sulfide phosphors having a wide range of composition. However, as a specific example of the preparation of a phosphor, we can use the following starting materials as fine powders in the proportions stated.

|       | Moles | Grams |
|-------|-------|-------|
| ZnS   | 19.0  | 1850  |
| ZnO   | 1.0   | 81    |
| CuO   | 0.02  | 1.4   |
| PbCO$_3$ | 0.08 | 21.6 |

Although the lead carbonate makes up about 1% by weight of the starting ingredients in the above table, the amount of lead present after firing in accordance with our method is only of the order of 0.001%, the difference being lost during the firing.

The zinc sulfide available commercially is made by a precipitation method, which leaves a small amount of hydrogen sulfide and water present as impurities. The precipitation is preferably from a solution of zinc sulfate containing a substantial amount of chloride, some of which is retained by the precipitate. The zinc sulfide used in the present example contained about 3.15% zinc chloride by weight, although other amounts of chloride can be used.

The chloride is used in the manufacture of the green-luminescent phosphor of the specific example described herein, and also in that of the yellow phosphor described in an application Serial No. 230,711, filed June 8, 1951, by Keith H. Butler, but is omitted in the manufacture of the blue-luminescent phosphor described in an application Serial No. 230,712, filed June 8, 1951, by the present inventors.

The zinc sulfide used as a raw material may be of either the fired or unfired type. Zinc carbonate or hydroxide may be used in place of zinc oxide, and other lead salts than the carbonate for example the oxide or sulfate, can be used. Lead sulfide should be avoided, because as we have shown above, its presence in the final phosphor is deleterious. Copper sulfide, cuprous oxide or other suitable copper salts may replace the cupric oxide.

The ingredients in the specific example were intimately mixed and then placed in trays of the dimensions described and fired by being moved slowly through the silica tube previously mentioned at a rate of about six inches every five minutes. The tray was moved first through the preheat zone, then through the main firing zone at the middle of the tube and finally through a cooling zone at the end of the main heating zone before being removed through the air lock. The cooling zone insures that the fired phosphor will not be removed from the furnace at a temperature high enough for appreciable oxidation in the presence of air. A temperature of about 500° F. is satisfactory at removal. The firing temperatures are of course much higher, preferably between about 1600° F. and 1800° F. a temperature of 1720° F. can be used.

Tables I and II below show the marked increase in luminescent output obtained by our new method, which we have called the "continuous" method for convenience, as compared with the older method, which we have called the "batch" method.

TABLE I

*Measurements at 500 volts*

| Sample | Firing Method | Temp. | Relative Output |
| --- | --- | --- | --- |
| A | Batch | 1,720 | 53 |
| B | do | 1,760 | 43 |
| C | do | 1,800 | 35 |
| D | do | 1,832 | 220 |
| E | Continuous | 1,700 | 665 |
| F | do | 1,720 | 900 |
| G | do | 1,740 | 770 |
| H | do | 1,785 | 565 |

TABLE II

*Measurements at various voltages*

| Voltage | Sample D, Batch Fired | Sample F, Continuous Process |
| --- | --- | --- |
| 150 | 0.3 | 6 |
| 200 | 3 | 26 |
| 250 | 12 | 62 |
| 300 | 27 | 135 |
| 350 | 52 | 250 |
| 400 | 88 | 408 |
| 450 | 140 | 608 |
| 500 | 220 | 900 |

It is clear from the above that the best phosphor output by our improved method was more than four times as high as the best phosphor produced by the other method.

In making samples according to the latter method, the mixture of raw materials was placed in a tray, inside a large silica tube closed by fusion at one end, the other end of the tube being sealed by a rubber stopper through which two smaller tubes passed. One of these served as a vent and extended only a short distance beyond the stopper. The other tube, also of silica, extended over the tray nearly to the closed end of the larger tube and served as a gas inlet. After inserting the tray, the assembly was flushed free of air by passing in a rapid stream of nitrogen. After the flushing, the nitrogen flow was reduced to about 0.06 liter per minute and the assembly was then inserted through a hole in the wall of a furnace heated to firing temperature so that the whole length containing the tray was uniformly heated. After firing, the assembly was withdrawn from the furnace and cooled in air to about 500° F. before opening to remove the tray of fired phosphor. During this cooling operation, the flow of nitrogen was again substantially increased to prevent entrance of air through the vent tube.

Before making the measurements in the tables, the phosphors fired by each method were all boiled with a hot 5% solution of acetic acid, dissolving most of the free zinc oxide. After this treatment the mixture was filtered and washed on the filter with two portions of ½% acetic acid followed by two washes with distilled water. The treated phosphor was dried and then mixed with cold pressed castor oil. The mixture of phosphor and oil was placed between a metal plate and a piece of conducting glass with spacers between so as to form a cell 0.010 inch thick. A 60 cycle A. C. voltage was applied and the light output measured by a phototube.

Other agents than acetic acid can be used for dissolving away the free zinc oxide without appreciably dissolving the zinc sulfide, for example ammonium acetate and other substances can be used as shown in the copending application Serial No. 180,783, filed August 22, 1950, by Elmer F. Payne.

The fired and washed phosphor powder is mixed with a dielectric material and placed in an electric field to obtain luminescence, as shown for example, in the copending application of Elmer F. Payne, above-mentioned. The dielectric material should be one of high resistivity, high dielectric strength, and high dielectric constant.

What we claim is:

1. The method of making an electroluminescent zinc sulfide phosphor from zinc sulfide which contains hydrogen sulfide as an impurity which will evolve on heating, and which also contains some chloride, said method comprising: mixing said zinc sulfide with activating compounds, including an activating compound of lead, in activating amounts as fine powders; firing the resultant mixture at a temperature high enough to evolve said hydrogen sulfide but insufficient to evolve substantial lead chloride, flushing said hydrogen sulfide away from the mixture rapidly enough to prevent appreciable reaction with the mixture, then firing the mixture at a high temperature while continuing the flushing, and cooling the resultant fired phosphor.

2. The method of claim 1, in which the higher temperature is about 1720° F.

3. The method of making an electroluminescent zinc sulfide phosphor from zinc sulfide which contains hydrogen sulfide as an impurity which evolves on heating, and which also contains some chloride, said method comprising: mixing said zinc sulfide with activating compounds, including atcivating compounds of copper and of lead, in activating amounts as fine powers; firing the resultant mixture at a temperature high enough to evolve said hydrogen sulfide but insufficient to evolve substantial lead chloride, flushing said hydrogen sulfide away from the mixture rapidly enough to prevent appreciable reaction with the mixture, then firing the mixture at a high temperature while continuing the flushing, and cooling the resultant fired phosphor.

4. The method of making an electroluminescent zinc sulfide phosphor from zinc sulfide which contains hydrogen sulfide as an impurity which evolves on heating, said method comprising: mixing said zinc sulfide with activating compounds of copper and lead in activating amounts as fine powders; firing the resultant mixture at a temperature high enough to evolve said hydrogen sulfide, flushing said hydrogen sulfide away from the mixture rapidly enough to prevent appreciable reaction with the mixture, cooling the resultant fired phosphor, then firing the mixture at a high temperature while continuing the flushing, and coating the resultant fired phosphor.

5. The method of making an electroluminescent phosphor from zinc sulfide which contains hydrogen sulfide as an impurity which will evolve on heating, and which also contains some chloride, said method comprising: mixing said zinc sulfide with a copper compound selected from the group consisting of the sulfide and oxide, and with a lead compound selected from the group consisting of the carbonate, the oxide, and the sulfate, in proportions of 0.02 mole of copper and 0.08 mole of lead per mole of zinc sulfide; firing the resultant mixture at a temperature high enough to evolve said hydrogen sulfide but insufficient to evolve substantial lead chloride, flushing said hydrogen sulfide away from the mixture rapidly enough to prevent appreciable reaction with the mixture, then firing the mixture at a high temperature while continuing the flushing, and cooling the resultant fired phosphor.

References Cited in the file of this patent

UNITED STATES PATENTS

| | | |
|---|---|---|
| 2,447,322 | Fonda | Aug. 17, 1948 |
| 2,624,857 | Mager | Jan. 6, 1953 |

FOREIGN PATENTS

| | | |
|---|---|---|
| 571,690 | Great Britain | Sept. 5, 1945 |